UNITED STATES PATENT OFFICE.

OTTO E. RUHOFF, OF MADISON, WISCONSIN, ASSIGNOR TO FRENCH BATTERY & CARBON CO., OF MADISON, WISCONSIN, A CORPORATION OF WISCONSIN.

PRIMARY BATTERY.

1,296,700.  Specification of Letters Patent.  Patented Mar. 11, 1919.

No Drawing.   Application filed June 9, 1917.   Serial No. 173,680.

*To all whom it may concern:*

Be it known that I, OTTO E. RUHOFF, a citizen of the United States, residing at Madison, in the county of Dane and State of Wisconsin, have invented a certain new and useful Improvement in Primary Batteries, of which the following is a specification.

The present invention relates to galvanic cells in which the carbon electrode is surrounded by a depolarizing mixture containing pulverized coke or graphite, as shown in many prior patents in the art. The object of this invention is to provide a change in the depolarizing mixture to greatly improve the strength, efficiency and life of the battery. Broadly speaking, the invention consists in substituting for a part or all of the ordinary carbonaceous material used in the depolarizing mixture so-called deflocculated electrically conductive material, such for example as the well known Acheson deflocculated graphite and in the method or process of mixing the ingredients of the depolarizing mixture. The invention consists more in detail in the features more fully hereafter set forth in the specification and claims.

In carrying out this invention, various proportions and materials may be employed, but a most satisfactory result is obtained when the materials used are in about the following proportions.

| | Parts by weight. |
|---|---|
| Manganese compound | 90 |
| Ordinary battery graphite | 15 |
| Deflocculated conductive material | 3 |
| Sal ammoniac | 12 |
| Water sufficient to moisten the ingredients so that they will pack nicely. | |

The best electrical results are obtained when the deflocculated conductive material constitutes approximately 20% of the carbonaceous material of the battery, and this is also advantageous because it is cheaper than when 100% of deflocculated conductive material is used.

The best results are also obtained when the materials above provided are mixed together by a peculiar method or process. That giving the best results consists in first stirring the deflocculated conductive material in a sufficient amount of water so as to produce a satisfactory suspension of the deflocculated conductive material, and adding to this the dry ordinary battery manganese compound, and agitating the mixture thoroughly, some sal ammoniac or similar salt is then added, and the mixture is again well agitated and is then filtered. The solid material is washed and dried. Before drying or after partially drying, a small quantity of a suitable binding material, such as a gum or sodium silicate may be added, and pressure may be applied to the material if desired. The dried product is ground and the dry battery graphite and more sal ammoniac is added. The resulting product is moistened with water or a suitable electrolyte in sufficient quantity to make it pack, as heretofore described.

Batteries equipped with the foregoing depolarizing agent, particularly when made by the above method, produce most satisfactory results not heretofore obtained.

The deflocculated materials may consist of compounds of a deflocculating agent, such as tannin or dextrin, with metals, conductive metallic oxids, such as the black oxid of iron, or materials consisting largely or wholly of carbon.

As is well understood by engineers, deflocculated materials are entirely different from the same materials when reduced to a fine state of division by ordinary processes of comminution, such as any ordinary method of grinding with or without air flotation, even when carried so far as to produce the so-called impalpable material employed in batteries of certain prior patents.

The deflocculated material referred to in the specification and claims is different from any other heretofore used in batteries in the following particulars: In the first place, this deflocculated material can be used only in the form of a dilute solution which is mixed with other battery ingredients, whereas other conductive material, such as carbon, graphite or lamp black are all used in the dry form. In the second place, other forms of conductive material, as covered by various patents usually constitute the whole amount of carbonaceous material that is present in the batteries, and work best when present to the extent of 100% of the conductive material used in the battery. This is not true with the deflocculated materials referred to herein, for, if such deflocculated materials are used alone, without the presence of any other conductive material, a decidedly inferior battery results. The best effect is obtained when the deflocculated material constitutes about 20% by weight of the total conductive material which is used.

Having thus described my invention, what I claim as new and desire to secure by Letters Patent, is:

1. As a constituent of an electric battery depolarizing materials, deflocculated conductive material.

2. A depolarizing mixture for electrical batteries, containing deflocculated conductive material and some other form of carbonaceous material.

3. A depolarizing material for electric batteries containing a mixture of deflocculated conductive material, ordinary battery graphite, sal ammoniac and water.

4. A depolarizing material for electric batteries consisting of a mixture of manganese compound, ordinary battery graphite, deflocculated conductive material, sal ammoniac, and water.

5. A depolarizing material for an electric battery made from the following material in approximately the proportions named by weight: manganese compounds 90 parts; ordinary battery graphite 15 parts; deflocculated conductive material 3 parts; sal ammoniac 12 parts, and water to moisten.

6. A depolarizing mixture for electrical batteries containing deflocculated conductive material and some other form of carbonaceous material, the deflocculated material being about twenty per cent. of total carbonaceous material.

In witness whereof, I have hereunto subscribed my name in the presence of two witnesses.

OTTO E. RUHOFF.

Witnesses:
J. E. BYRNS,
H. S. CHENEY.